US009083682B2

(12) United States Patent
Tanizawa et al.

(10) Patent No.: US 9,083,682 B2
(45) Date of Patent: Jul. 14, 2015

(54) COMMUNICATION DEVICE AND COMPUTER PROGRAM PRODUCT

(71) Applicant: Kabushiki Kaisha Toshiba, Minato-ku (JP)

(72) Inventors: Yoshimichi Tanizawa, Kanagawa (JP); Hideaki Sato, Kanagawa (JP); Shinichi Kawamura, Tokyo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 21 days.

(21) Appl. No.: 14/018,798

(22) Filed: Sep. 5, 2013

(65) Prior Publication Data

US 2014/0181508 A1    Jun. 26, 2014

(30) Foreign Application Priority Data

Sep. 7, 2012 (JP) .................................. 2012-197249

(51) Int. Cl.
*H04L 9/00* (2006.01)
*H04L 29/06* (2006.01)
*H04L 9/08* (2006.01)

(52) U.S. Cl.
CPC .......... *H04L 63/0428* (2013.01); *H04L 9/0858* (2013.01); *H04L 63/166* (2013.01); *H04L 63/18* (2013.01)

(58) Field of Classification Search
CPC ... H04L 63/0428; H04L 63/18; H04L 63/166; H04L 9/0858
USPC ........................................................ 713/162
See application file for complete search history.

(56) References Cited

U.S. PATENT DOCUMENTS 5,600,722 A * 2/1997 Yamaguchi et al. .......... 713/155
2003/0191963 A1 * 10/2003 Balissat et al. ................ 713/201

FOREIGN PATENT DOCUMENTS

JP    6-318939 A    11/1994
JP    2008-154019    7/2008

OTHER PUBLICATIONS

O. Maurhart, "QKD Networks Based on Q3P", Applied Quantum Cryptography, Lect. Notes Phys., Chapter 8, vol. 797, 2010, pp. 151-171.
Mehrdad Dianati, et al., "Architecture and protocols of the future European quantum key distribution network", Security and Communication Networks, vol. 1, 2008, pp. 57-74.
Office Action issued Aug. 19, 2014 in Japanese Patent Application No. 2012-197249 (with English language translation).
Office Action mailed on Mar. 10, 2015 in Japanese Patent Application No. 2012-197249, along with its English translation.

* cited by examiner

*Primary Examiner* — Baotran N To
(74) *Attorney, Agent, or Firm* — Oblon, McClelland, Maier & Neustadt, L.L.P.

(57) ABSTRACT

According to an embodiment, a communication device includes a cryptographic communication unit, a first communicating unit, and a control unit. The cryptographic communication unit is configured to perform cryptographic communication with an external device via a first network. The first communicating unit is configured to perform communication with a key generating device via a second network, the key generating device being configured to generate a cryptographic key to be used in the cryptographic communication. The control unit is configured to perform control to transmit an address registration request containing address information to the key generating device via the first communicating unit when a predetermined specific request is issued from among requests used in the cryptographic communication.

6 Claims, 10 Drawing Sheets

| APPLICATION (SERVER DEVICE) IP ADDRESS | APPLICATION (SERVER DEVICE) PORT | IP ADDRESS OF CORRESPONDING NODE |
|---|---|---|
| 192.168.10.1 | 5000 | 10.0.0.8 |
| 192.168.10.2 | 6000 | 10.0.0.8 |
| 192.168.20.1 | 80 | 10.0.0.7 |
| 192.168.20.2 | 8080 | 10.0.0.7 |
| | | |

COMMUNICATION DEVICE AND COMPUTER PROGRAM PRODUCT

CROSS-REFERENCE TO RELATED APPLICATION(S)

This application is based upon and claims the benefit of priority from Japanese Patent Application No. 2012-197249, filed on Sep. 7, 2012; the entire contents of which are incorporated herein by reference.

FIELD

An embodiment described herein relates generally to a communication device and a computer program product.

BACKGROUND

A cryptographic communication network is known that is configured with a plurality of networked nodes which is mutually connected by a plurality of links. Each node has the function of generating and sharing a random number with opposite nodes that are connected by links, as well as has the function of performing cryptographic communication over a link by using a random number as a cryptographic key (hereinafter, referred to as "a link key"). Moreover, some of the nodes also have the function of generating a random number independent of the links, as well as have the function of transmitting the generated random number to a different node. In a cryptographic communication network, an application has the function of obtaining a random number from a node, using that random number as a cryptographic key (hereinafter, referred to as "an application key"), and performing cryptographic communication with another application. Herein, an application can be configured in an integrated manner with the nodes, or can be configured as a terminal independent of the nodes.

In a node, the function by which a random number (a link key) is generated and shared with opposite nodes connected by links can be implemented using a technology that is commonly called quantum cryptographic communication. In this case, the technology by which, in a node, a random number (an application key) is generated independent of the links and transmitted to a different node via a link is called quantum key distribution (QKD).

However, in the conventional technology, an application that implements the cryptographic communication function using a cryptographic communication network needs to follow a complex sequence of operations such as in-advance address registration with respect to the cryptographic communication network, issuing of communication instructions to the cryptographic communication network, and obtaining of keys. For that reason, performing cryptographic communication from an existing application through the use of a cryptographic communication network is a difficult task.

DETAILED DESCRIPTION

According to an embodiment, a communication device includes a cryptographic communication unit, a first communicating unit, and a control unit. The cryptographic communication unit is configured to perform cryptographic communication with an external device via a first network. The first communicating unit is configured to perform communication with a key generating device via a second network, the key generating device being configured to generate a cryptographic key to be used in the cryptographic communication. The control unit is configured to perform control to transmit an address registration request containing address information to the key generating device via the first communicating unit when a predetermined specific request is issued from among requests used in the cryptographic communication.

An exemplary embodiment of a communication device is described below in detail with reference to the accompanying drawings.

Embodiment

A communication device according to an embodiment automates an address registration operation that is performed so as to make use of the cryptic function of a cryptographic communication network. For example, the communication device makes use of application program interfaces (APIs) of a commonly-used and existing cryptographic library; appropriately calls various communication operations such as address registration, communication instruction, and key acquisition that are performed with a cryptographic communication network; and implements a proper sequence of using the cryptographic communication network.

Figure 1:
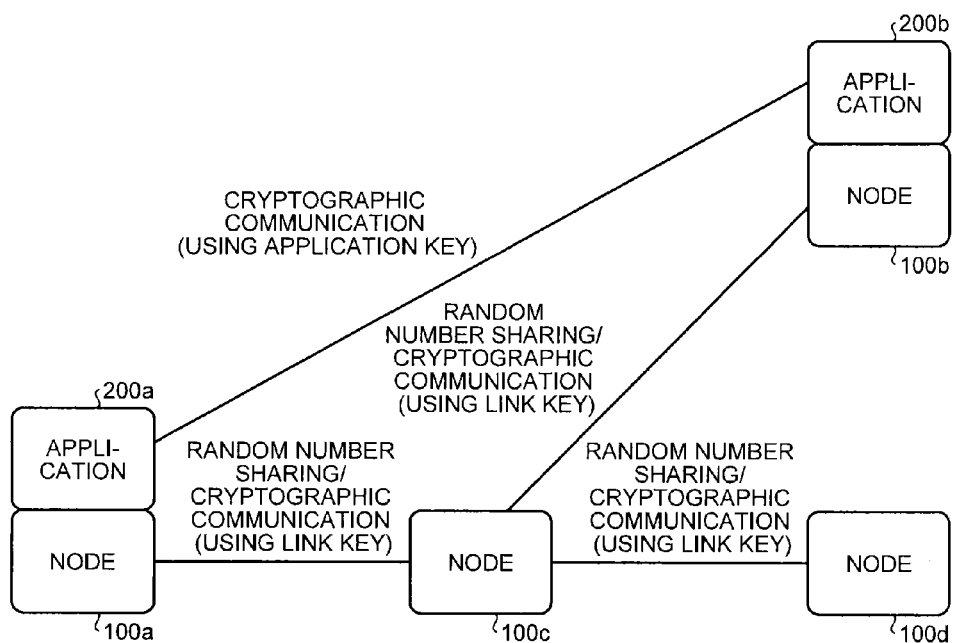
FIGS. 1 to 3 illustrate examples of network configuration diagrams of a communication system according to an embodiment.

FIG. 1 is a diagram illustrating a network configuration example of a communication system according to the embodiment. The communication system includes nodes 100a to 100d, which function as key generating devices, and includes applications 200a and 200b, which function as communication devices.

When there is no need to distinguish between the nodes 100a to 100d, they are simply referred to as nodes 100. Similarly, when there is no need to distinguish between the applications 200a and 200b, they are simply referred to as applications 200. Meanwhile, the number of nodes 100 is not limited to four, and the number of applications 200 is not limited to two.

As described above, each node 100 has the function of generating and sharing a random number with opposite nodes and has the function of performing cryptographic communication over links (in FIG. 1, "random number sharing/cryptographic communication") by using a random number as a cryptographic key. Moreover, each node 100 can also have the function of generating a random number independent of the links, and the function of transmitting the generated random number to a different node.

Figure 2:
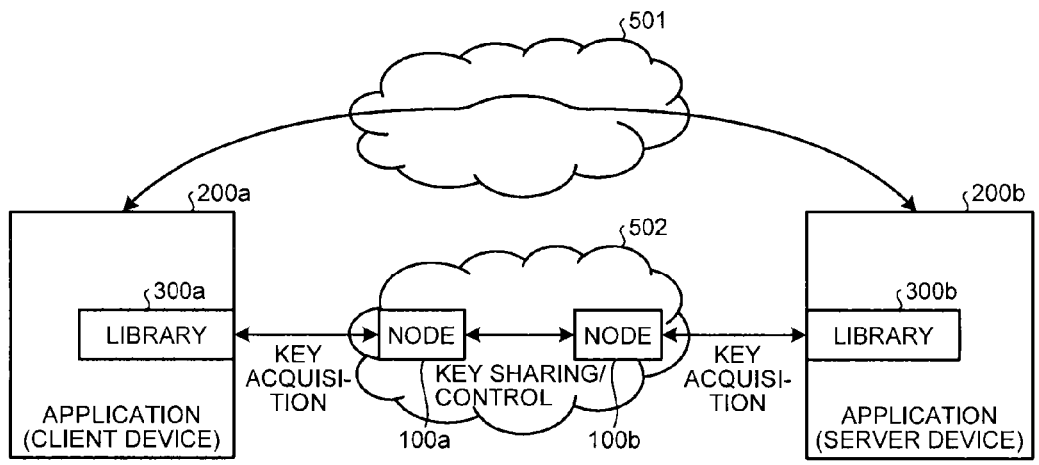

FIG. 2 is a diagram illustrating a network configuration example of the communication system according to the embodiment. In FIG. 2, it is illustrated that each application 200 illustrated in the network configuration example illustrated in FIG. 1 is configured independent of the nodes, as well as includes a library 300 (300a or 300b). A network 501 (a first network) corresponds to "cryptographic communication (using application key)" illustrated in FIG. 1. A network 502 (a second network) corresponds to "random number sharing/cryptographic communication (using link key)" illustrated in FIG. 1. In the following explanation, the network 501 is sometimes called an application network, and the network 502 is sometimes called a cryptographic communication network.

As illustrated in FIG. 2, one of the applications 200 operates as a client device (and is called an application client), while the other application 200 operates as a server device (and is called an application server). Alternatively, each application 200 can be configured to include the functions of a client device as well as the functions of a server device. The following explanation is given under the assumption that the application 200a functions as the application client and the application 200b functions as the application server.

Figure 3:
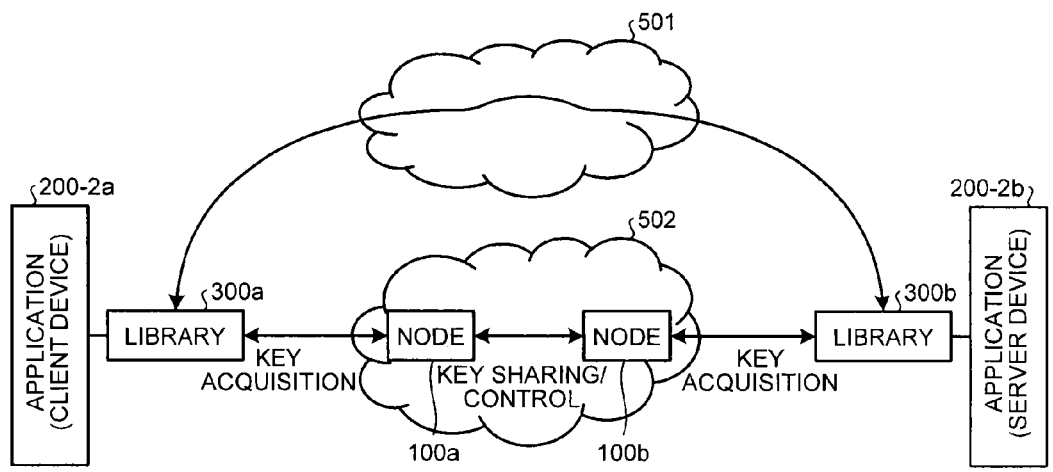

In the embodiment, library functions are introduced (in the form of the libraries 300a and 300b illustrated in FIG. 2). FIG. 2 illustrates an example in which the library functions are implemented as part of the applications 200. Alternatively, the library functions can also be implemented using communication devices (library devices) that are installed intermediately between the applications 200 and the nodes 100. FIG. 3 is a diagram illustrating a network configuration example of a communication system that is configured in that alternative manner. That is, FIG. 3 illustrates an example in which the libraries 300a and 300b are provided on the outside of applications 200-2a and 200-2b that are not equipped with the library functionality.

The following explanation is given for the example illustrated in FIG. 2 in which the library functions are implemented as part of the applications 200.

Figure 4:
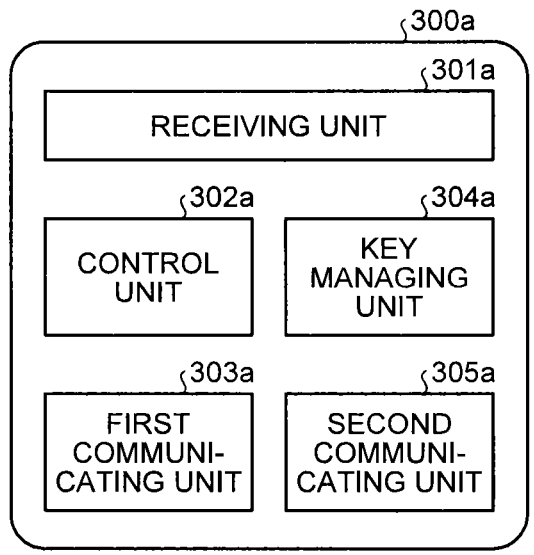
FIG. 4 is a block diagram illustrating a library in a client device according to the embodiment.

Each library 300 performs operations, which are required by the corresponding application 200 to perform cryptographic communication by implementing the functions of a cryptographic communication network, without making the corresponding application 200 aware of those operations. FIG. 4 is a block diagram illustrating a configuration example of the library 300a that corresponds to the library functions in a client device. As illustrated in FIG. 4, the library 300a includes a receiving unit 301a, a control unit 302a, a first communicating unit 303a, a key managing unit 304a, and a second communicating unit 305a.

The receiving unit 301a receives a request related to cryptographic communication from the application 200a. The control unit 302a controls the overall operations of the device.

In response to the request received from the application 200a, the first communicating unit 303a performs communication (for issuing a key request, obtaining a key, registering an address, and searching for an address) that needs to be performed with the corresponding node 100 via a cryptographic communication network.

The key managing unit 304a holds and manages the keys, which are obtained from the corresponding node 100, till the application 200a uses them.

The second communicating unit 305a performs, on behalf of the application 200a, encryption data communication over the application network. Alternatively, the configuration can be such that the communication itself is performed by the application 200a, and the second communicating unit 305a implements only some functions such as encryption and decryption of data that is required during the communication (i.e., implements cryptic functions). One of the cryptic functions that can be provided is to make use of an application key held by the key managing unit and perform encryption and decryption of the data that is required during the cryptographic communication. Meanwhile, there is no particular restriction on the type/variation of the cryptographic algorithm (the encryption method) used by the cryptic functions. Thus, the application key also may or may not be used. Moreover, for example, a block cipher such as the advanced encryption standard (AES) can be used, or a Vernam cipher such as the one-time pad (OTP) can be used.

Figure 5:
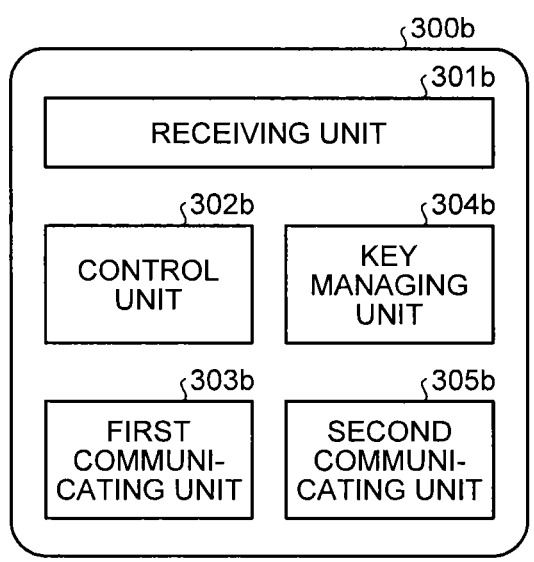
FIG. 5 is a block diagram illustrating a library in a server device according to the embodiment.

FIG. 5 is a block diagram illustrating a configuration example of the library 300b that corresponds to the library functions in a server device. As illustrated in FIG. 5, the library 300b includes a receiving unit 301b, a control unit 302b, a first communicating unit 303b, a key managing unit 304b, and a second communicating unit 305b.

The receiving unit 301b receives a request related to cryptographic communication from the application 200b.

The control unit 302b controls the overall operations of the device. For example, when a predetermined specific request is issued from among the requests used during the cryptographic communication, the control unit 302b performs control to issue an address registration request containing address information to the corresponding node 100 via the first communicating unit 303b.

The key managing unit 304b holds and manages the keys, which are obtained from the corresponding node 100, till the application 200b uses them.

The second communicating unit 305b performs, on behalf of the application 200b, encryption data communication over the application network. Alternatively, the configuration can be such that the communication itself is performed by the application 200b, and the second communicating unit 305b implements only some functions such as encryption and decryption of data that is required during the communication (i.e., implements cryptic functions). One of the cryptic functions that can be provided is to make use of an application key held by the key managing unit and perform encryption and decryption of the data that is required during the cryptographic communication. Meanwhile, there is no particular restriction on the type/variation of the cryptographic algorithm (the encryption method) used by the cryptic functions. Thus, the application key also may or may not be used. Moreover, for example, a block cipher such as the advanced encryption standard (AES) can be used, or a Vernam cipher such as the one-time pad (OTP) can be used.

Meanwhile, each of the key managing units 304a and 304b can be configured with any commonly-used memory medium such as a hard disk drive (HDD), an optical disk, a memory card, and a random access memory (RAM).

Figure 6:
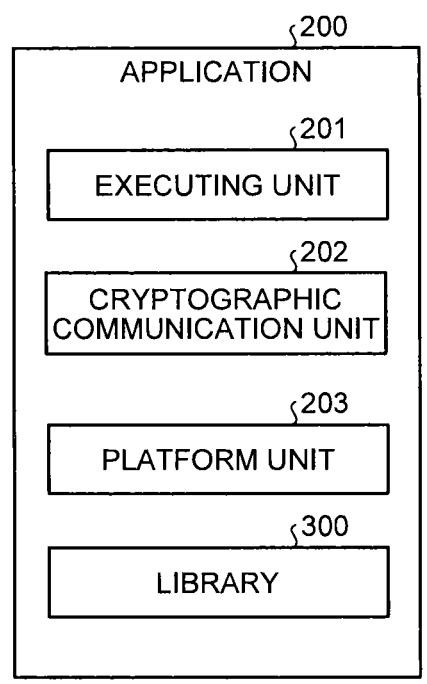
FIG. 6 is a block diagram illustrating an application according to the embodiment.

FIG. 6 is a block diagram illustrating a configuration example of the application 200 according to the embodiment. As illustrated in FIG. 6, the application 200 includes an executing unit 201, a cryptographic communication unit 202, a platform unit 203, and the library 300.

The executing unit 201 implements an application function for performing cryptographic communication. As long as communication is possible, there is no particular restriction on the type of the application function. For example, the executing unit 201 implements a video transmission function. With that, the executing unit 201 transmits transmit data to the cryptographic communication unit 202 and receives incoming data from the cryptographic communication unit 202.

The cryptographic communication unit 202 performs cryptographic communication with an external device, such as another application 200, via the application network. At that time, the cryptographic communication unit 202 performs encryption/decryption using the abovementioned functions of the library 300. Herein, the operation of transmitting the encrypted data or the operation of receiving the encrypted (and pre-decryption) data can be performed either by the library 300 or by the cryptographic communication unit 202.

The platform unit 203 provides operating system functionality of a computer that is necessary for operations and management of the other constituent elements in the application 200.

Meanwhile, the constituent elements illustrated in FIGS. 4 to 6 can be implemented by running computer programs in a processing unit such as a central processing unit (CPU), that is, can be implemented using software; or can be implemented using hardware such as an integrated circuit (IC); or can be implemented using a combination of software and hardware.

Given below is the explanation of a sequence of basic operations performed according to the embodiment. In the explanation according to the embodiment, it is assumed that the applications 200 are created according to SSL APIs (SSL stands for Secure Sockets Layer) (or TLS APIs, where TLS stands for Transport Layer Security) that represent the commonly-used existing cryptographic library (classical cryptography). However, in practice, the applications 200 are not limited to be created according to SSL APIs. Alternatively, any cryptographic communication library APIs that enable perform a sequence of operations including generation of contexts, establishment of connection, communication of encryption data, and release of connection can be used in creating the application 200.

Figure 7:
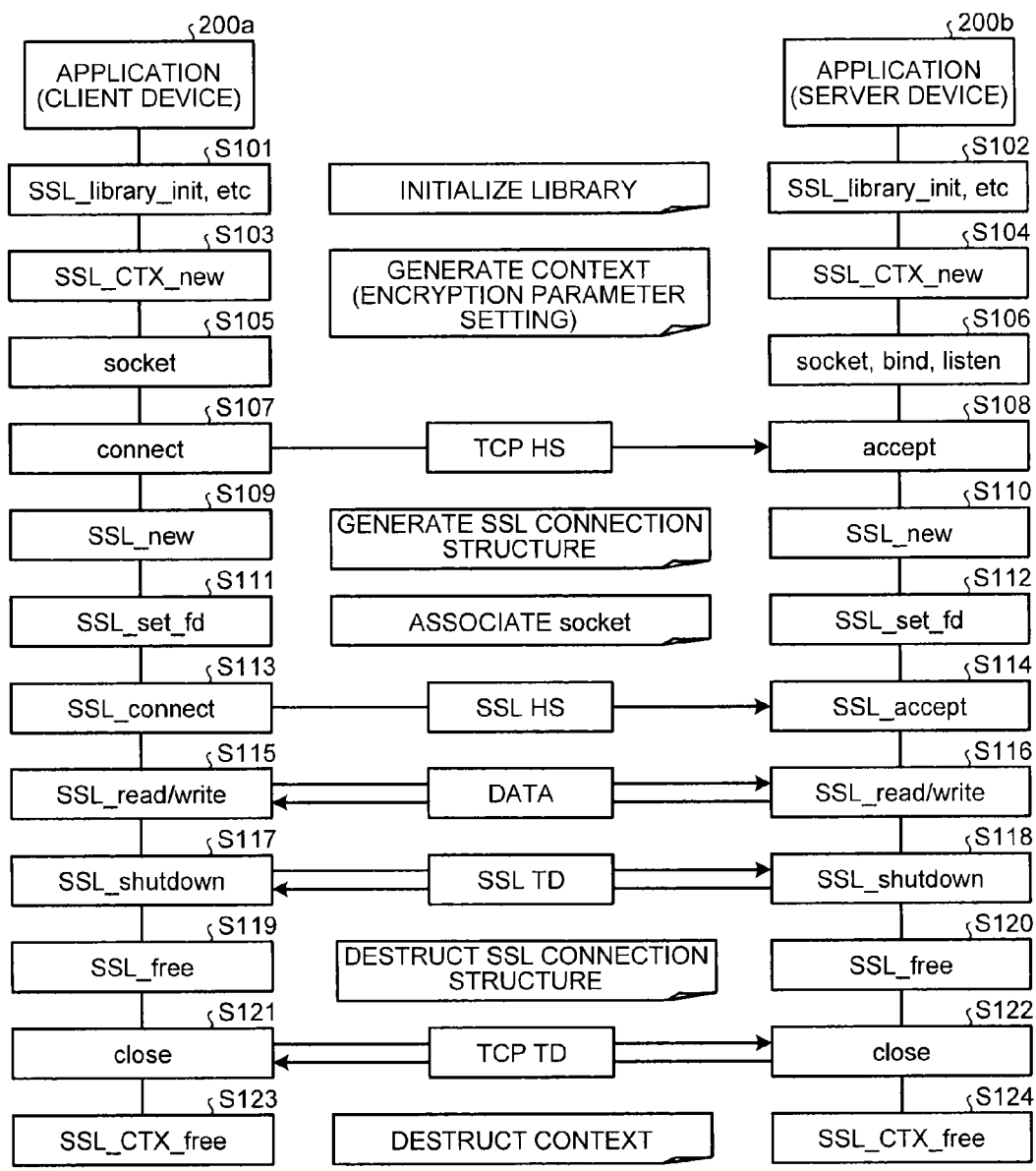
FIG. 7 is a diagram illustrating an exemplary sequence of operations performed during SSL communication according to the embodiment.

FIG. 7 is a diagram illustrating an exemplary sequence of operations performed during SSL communication according to the embodiment. FIG. 7 illustrates an exemplary sequence of operations performed during SSL communication and illustrates exemplary APIs that are called during the SSL communication. Thus, explained with reference to FIG. 7 is the basic sequence of operations performed using an SSL library.

Firstly, each of the application 200a and the application 200b initializes a cryptographic communication library API (SSL_library_init: Step S101, Step S102). Then, each of the application 200a and the application 200b sets an encryption parameter that is to be used (or that can be used) and generates context (SSL_CTX_new: Step S103, Step S104).

Subsequently, the application 200a and the application 200b create respective sockets (socket: Step S105, socket, bind, listen: Step S106) and establish a connection (connect: Step S107, accept: Step S108). This sequence of operations is not the part of the SSL library but is required while performing network communication.

Then, each of the application 200a and the application 200b generates an SSL connection structure (SSL new: Step S109, Step S110). Then, the application 200a and the application 200b associate the respective SSL connection structures with the respective sockets (SSL_set_fd: Step S111, Step S112).

Subsequently, the application 200a and the application 200b perform an SSL handshake (SSL HS) (SSL_connect: Step S113, SSL_accept: Step S114). At this step, negotiation is done regarding the encryption parameter to be used in the cryptographic communication, and the necessary authentication of the other side of communication is performed. As a result, an SSL connection gets established.

Then, the application 200a and the application 200b transmit and receive data (SSL read/write: Step S115, Step S116). Herein, the data is transmitted upon being encrypted and is received upon being decrypted.

Once the necessary communication is performed, the application 200a and the application 200b release the connection (SSL_shutdown: Step S117, Step S118). Then, the application 200a and the application 200b destroy the respective SSL connection structures (SSL_free: Step S119, Step S120).

Subsequently, the application 200a and the application 200b close the respective sockets (close: Step S121, Step S122). This sequence of operations is not the part of the SSL library but is required while performing network communication.

Then, the application 200a and the application 200b destroy the respective contexts (SSL CTX free: Step S123, Step S124).

Meanwhile, in the embodiment, the following operations (1) to (4) are additionally carried out using the libraries 300a and 300b. As a result, it becomes possible to perform cryptographic communication through the use of a cryptographic communication network.

(1) At the time of setting the encryption parameter at Step S103 and Step S104, the cipher text that uses the cryptographic communication network is also made selectable and parameter-settable. The cipher text using the cryptographic communication network can have, for example, a parameter that simply indicates whether or not the cryptographic communication can be performed through the use of the cryptographic communication network. Moreover, in the case of performing cryptographic communication through the use of the cryptographic communication network, the abovementioned parameter can also contain information related to the frequency of obtaining the requested cryptographic key. Alternatively, the cipher text can have a parameter that specifies the cryptographic algorithm to be implemented during the actual cryptographic communication. If there exists a plurality of cryptographic communication networks, then the parameter of a cipher text can be an identifier that specifies which cryptographic communication network is to be used for cryptographic communication. As a specific library API, for example, it is possible to use SSL_CTX_new( ).

(2) As a result of performing negotiation regarding the encryption parameter at Step S113 and Step S114, if it is determined to perform cryptographic communication through the use of the cryptographic communication network; then various initialization operations are performed that are necessary in order to enable cryptographic communication through the use of the cryptographic communication network. One of those initialization operations is to perform address registration and searching that is necessary in order to share the same cryptographic key (application key) via the cryptographic communication network. Another initialization operation is to obtain the cryptographic key (application key) that is necessary in order to perform cryptographic communication or authentication. In order to perform such initialization operations, address information can be transmitted to the nodes 100 and a request for obtaining the application key can be issued. As specific library APIs, for example, it is possible to use SSL_connect( ) and SSL_accept( ).

(3) In order to perform cryptographic communication (cryptographic communication of data) using the cryptographic communication network at Step S115 and Step S116, it is necessary to obtain an application key on a periodic basis. For that reason, an operation of requesting the node 100 for the application key and obtaining the application key can be performed, as well as an operation of encrypting or decrypting communication data using the obtained application key can be performed. As specific library APIs, for example, it is possible to use SSL_read( ) and SSL_write( )

(4) In order to end the cryptographic communication (cryptographic communication of data) being performed through the use of a cryptographic communication network at Step S117 and Step S118, a notification about ending the use of the application key can be transmitted to the node corresponding 100. As a specific library, for example, it is possible to use SSL shutdown( ).

Figures 8, 9:
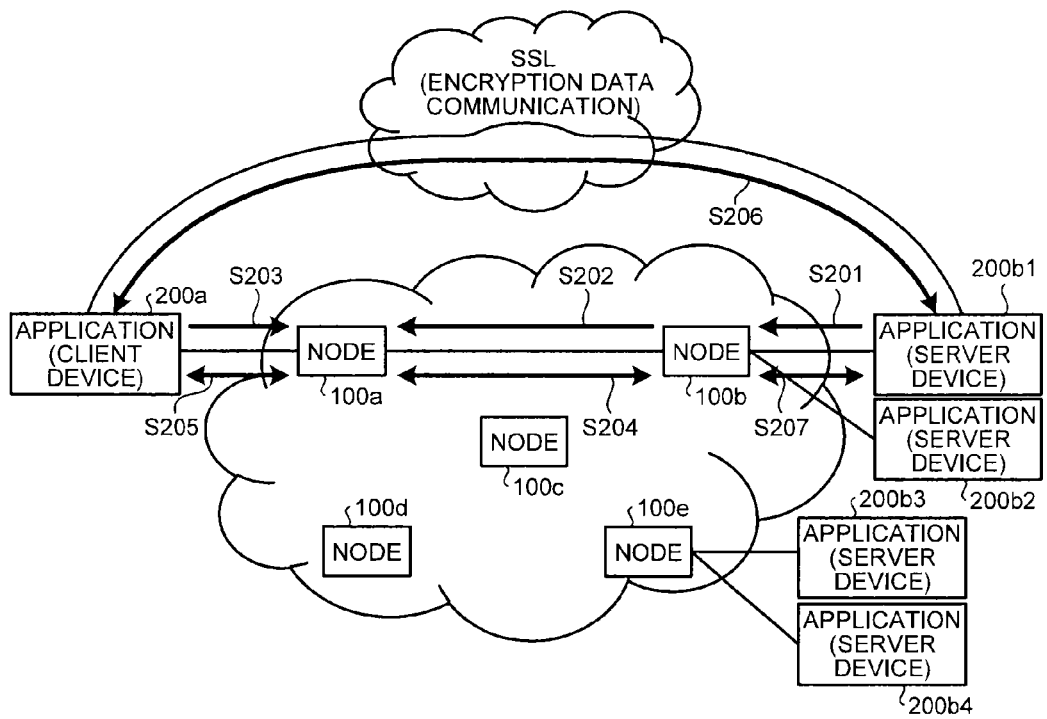
FIG. 8 is a diagram for explaining an example of an address registration operation, an address sharing operation, and an address searching operation according to the embodiment.
FIG. 9 is a diagram illustrating an example of service mapping information according to the embodiment.

Explained below with reference to FIG. 8 and FIG. 9 is an address registration operation performed by the library 300 (the control unit 302) according to the embodiment, an address sharing operation performed in the cryptographic communication network according to the embodiment, and an address searching operation performed by the library 300 (the control unit 302) according to the embodiment. FIG. 8 is a diagram for explaining an example of the address registration operation, the address sharing operation, and the address searching operation. FIG. 9 is a diagram illustrating an example of the information (service mapping information) that is shared among the nodes 100.

Consider a case in which an application client (the application 200a) wishes to obtain an application key for the purpose of performing cryptographic communication with an application server (the application 200b). At that time, it is necessary that the node 100a to which the application client is connected exchanges the application key with the node 100b to which the application server is connected, so as to ensure that the application client and the application server are provided with the same application key.

FIG. 8 is a diagram illustrating a sequence of operations performed with the aim of implementing this function. Herein, "APPLICATION (SERVER DEVICE)" represents the application 200 serving as the application server (i.e., represents the application 200b); while "APPLICATION (CLIENT DEVICE)" represents the application 200 serving as the application client (i.e., represents the application 200a). In the example illustrated in FIG. 8, the communication system includes four application servers (applications 200b1 to 200b4) and five nodes 100a to 100e.

Upon activating the server functionality of itself, the application server transmits service information thereof to the node 100 connected thereto (Step S201). Herein, the service information contains at least the IP address of the application server. Besides, the service information can contain the port number used by the service, identification information indicating the type of the service, information related to an interface that is required while using the service, and the requested throughput for the purpose of using the service. Meanwhile, the operation of notifying a node about the service information of an application server is called the address registration operation.

Meanwhile, although not particularly illustrated, there are times when the service information such as the IP address of an application server undergoes a change due to, for example, shifting the location of the computer in which that application server is running. In such a case, in an identical manner to Step S201, the application server can notify the corresponding node 100 about the change in the IP address. Moreover, also at the time of terminating the service, in an identical manner to Step S201, the application server can notify the corresponding node 100 about the termination in the service.

The node 100 holds such service information in a corresponding manner to the identifier of itself (generally, IP address information). Then, the node 100 shares the information (service mapping information), in which the service information and the identifier are held in a corresponding manner, to the other nodes 100 that constitute the cryptographic communication network (Step S202).

FIG. 9 is a diagram illustrating an example of the service mapping information. Herein, the service mapping information contains the IP address of each application server, the port number of each application server, and the IP address of the corresponding node 100.

There is no particular restriction on the method by which the nodes 100 share the respective set of service mapping information. For example, a node 100 can share the service mapping information thereof by sharing it with all other nodes 100 that constitute the cryptographic communication network. Alternatively, the service mapping information can be shared using a single representative node 100 in the cryptographic communication network. That is, the configuration can be such that all sets of service mapping information are transmitted to the representative node 100, and the representative node 100 behaves as a directory service for sharing the service mapping information with all nodes 100 present on the cryptographic communication network.

Next, consider a case in which a particular application client wishes to communication with a particular application server. In that case, to the node 100a connected thereto, the application client transmits the IP address of the application server with which communication is to be performed (Step S203). Herein, the operation in which, in order to obtain the application key shared with the other side of communication, an application client notifies the corresponding node 100 about the IP address of the other side of communication is called an address searching operation. The following explanation is given for an example in which an application client communicates with the application 200b1.

When the node 100a receives a notification about the IP address of the application server (the application 200b1) from an application client; the node 100a obtains the IP address of the node 100b to which that application server is connected, and starts a sharing operation of sharing the necessary application key with the node 100b (Step S204). At that time, the node 100a can respond to the application client with a notification that the address searching operation was successful. Alternatively, prior to starting the sharing operation of sharing the application key with the node 100a, the node 100b can provide the information about the application client to the corresponding application server and inquire about whether or not to start sharing the application key. Then, depending on the result of the inquiry, the node 100b can determine whether or not to perform the sharing operation of sharing the application key, or can determine the frequency of performing the sharing operation. Still alternatively, if a sufficient number of already-shared application keys are held and if a sharing operation of sharing an application key is already started, then a new sharing operation (Step S204) may not be started.

At this point of time, it has been possible to start the sharing operation of sharing the application key between the node 100a and the node 100b. For that reason, the application client and the application server can perform following operations that are necessary in establishing a session to perform encryption data communication via the application network: an obtaining operation of obtaining an application key for authentication (Step S205); an authentication operation to be performed at the time of establishing a session (Step S206); an obtaining operation of obtaining an application key to be used in encryption and decryption of data (Step S207); and an actual encryption data communication operation to be performed via the application network (Step S206).

In the embodiment, on behalf of the application 200, the library 300 performs at least one of the following operations: the address registration operation; the address searching operation; the obtaining operation of obtaining the necessary application key; the authentication operation at the time of establishing a session; and the encryption data communication operation.

Figure 10:
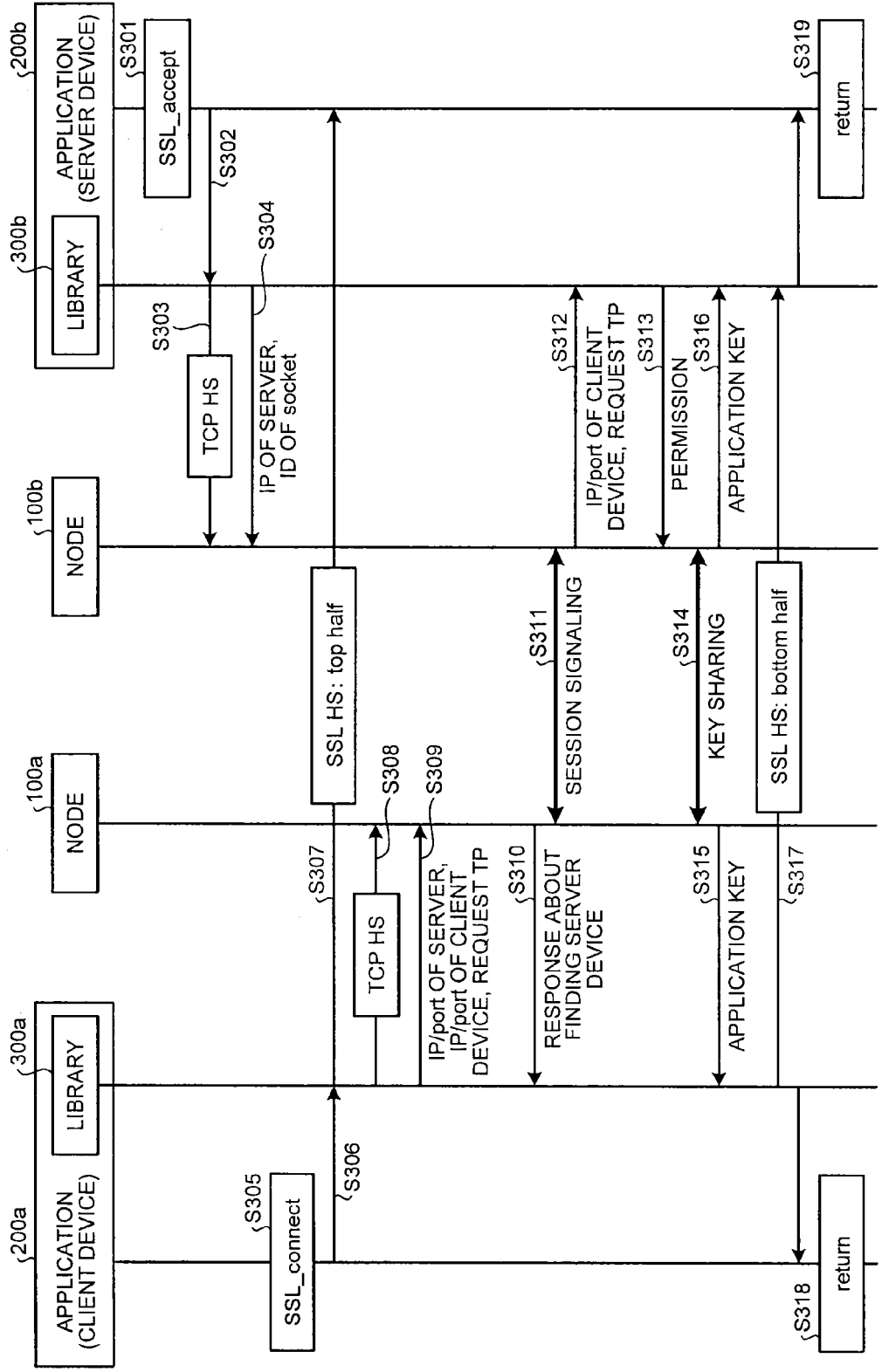
FIG. 10 is a sequence diagram for explaining the address registration operation, the address sharing operation, and an application key obtaining operation according to the embodiment.

Given below is the explanation of an example of the detailed sequence followed among the application 200, the library 300, and the node 100. Firstly, explained with reference to FIG. 10 are the address registration operation and the address searching operation performed at (2) mentioned above, as well as an application key obtaining operation performed for the first time.

The application server shifts to a wait mode for encryption data communication. This operation is started by, for example, calling SSL_accept( )API that is a connection wait request (Step S301). After that, the application server can shift to the wait mode. In this way, in the embodiment, the connection wait request (SSL_accept) is used as a specific request. However, from among the requests (APIs) used during the cryptographic communication, any other request other than the connection wait request (SSL_accept) can be used as a specific request.

The library 300b detects the abovementioned operation and starts communicating with the node 100b that is in the relation of connection (Step S302). At that time, for example, a connection for communication can be established with the node 100b for the first time (Step S303). At the same time, the library 300b transmits the service information containing the IP address of the application server (i.e., issues an address registration request) to the node 100b (Step S304). Herein, the library 300b can obtain the service information in advance by implementing some sort of method. With this, the address registration operation is performed.

In the wake of the abovementioned notification, the service mapping information is shared in the node 100b on the cryptographic communication network (not illustrated).

Meanwhile, in the application client, the IP address of the application server is specified and the start of cryptographic communication is requested (i.e., a handshake operation is requested) (Step S305 to Step S307). The handshake operation is started by, for example, calling SSL_connect( ) API (Step S305). The start request contains the IP address of the application server. Then, the application client directly negotiates with the application server about the encryption parameter (a part of the handshake operation (SSL HS: top half), Step S307). Meanwhile, the negotiation operation can also be performed via the libraries of the application client and the application server. After that, the application client can shift to the wait mode.

If the result of the negotiation indicates that the cryptographic algorithm to be used by the application server is the cryptographic algorithm in which a cryptographic key is used, then the library 300 (the control unit 302) performs control so that the cryptographic communication is performed via the second communicating unit 305. That is, if the negotiation regarding the encryption parameter results in an agreement to perform encryption data communication using the cryptographic communication network; then the library 300a on the application client side transmits, to the node 100a that is in the relation of connection, the information containing the IP address information of the application server with which the application client wishes to communicate (the address searching operation, Step S309). Meanwhile, at that time, for example, the library 300a can establish a connection to perform communication with the node 100a for the first time (Step S308).

Upon receiving a notification from the application client, the node 100a refers to the service mapping information that has been shared and identifies the node 100 to which the application server is connected. Subsequently, the node 100a can respond to the application client or to the identified node 100 with a notification that the application server is found (Step S310).

Then, the node 100a starts the sharing operation of sharing the application key (Step S311). At that time, the node 100b on the application server side can provide the library 300b or the application server with the IP address information of the application client that requests for cryptographic communication, and can confirm whether or not to perform cryptographic communication via the cryptographic communication network (Step S312, Step S313). As a result, the application key gets shared between those nodes (the node 100a and the node 100b) (Step S314).

The node 100a and the node 100b provide the shared application key as well as provide information about a session identifier used in identifying the sharing of the application key to the application client (the library 300a) and the application server (the library 300b), respectively (Step S315, Step S316).

Then, the libraries 300a and 300b can refer to the application key information and perform an authentication operation for starting cryptographic communication (a part of the handshake operation (SSL HS: bottom half), Step S317). Alternatively, the handshake operation can be completed with a predetermined different authentication operation without using the application key information. As soon as the handshake operation is completed, the libraries 300 can end the operations and return the control to the application client and the application server (Step S318, Step S319).

Figure 11:
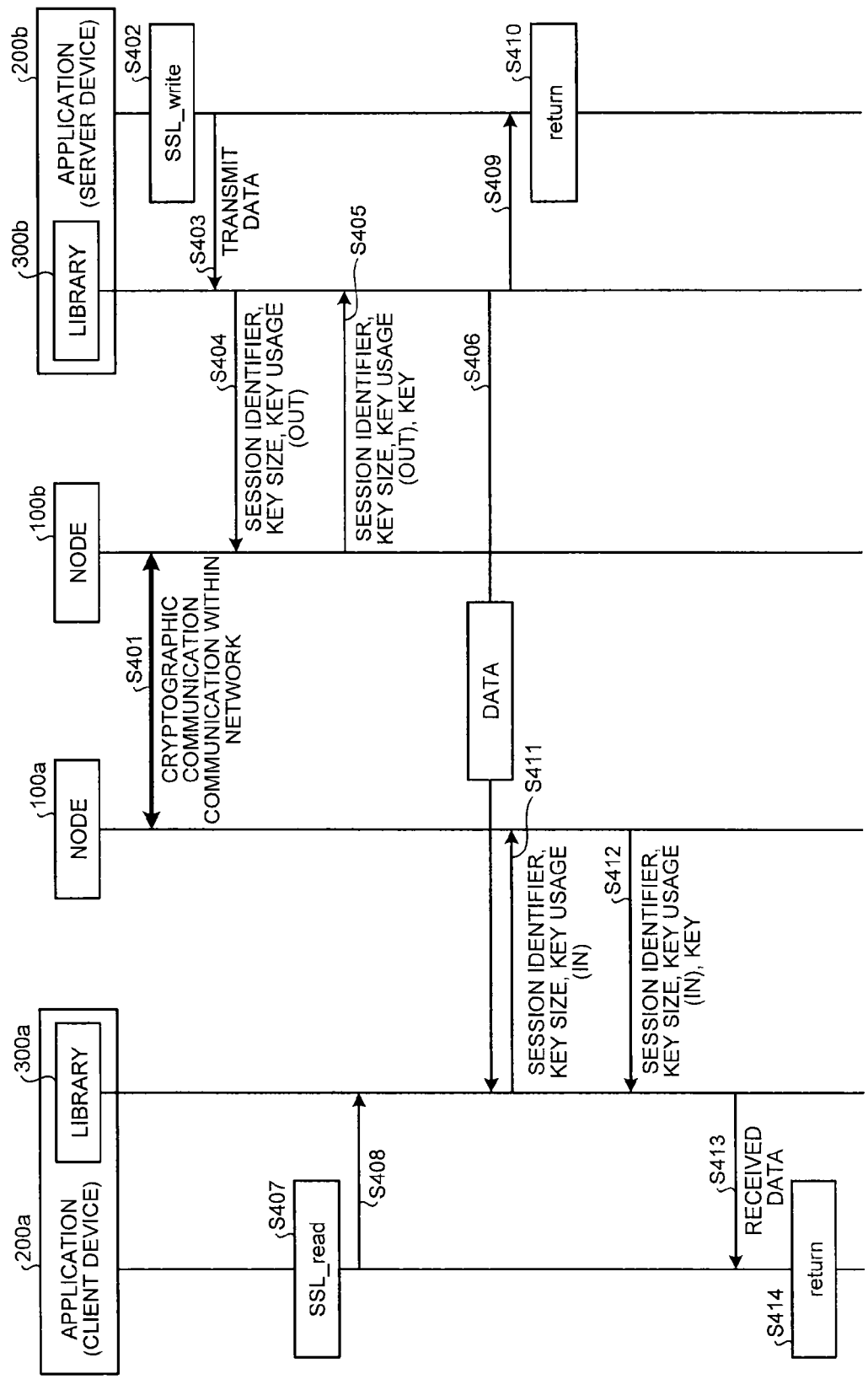
FIG. 11 is a sequence diagram for explaining an encryption data communication operation according to the embodiment.

Explained below with reference to FIG. 11 is the operation of encryption data communication performed at (3) mentioned above. As a result of the operation illustrated in FIG. 10, communication within the cryptographic communication network is established between the node 100 and the node 100b (Step S401).

The application 200b on the encryption data transmission side specifies the data and instructs cryptographic communication (Step S402, Step S403). With reference to FIG. 11, the explanation is given for a case in which the application 200b, which serves as the application server, is the encryption data transmission side. However, alternatively, the application client (the application 200a) can also be the encryption data transmission side. The instruction for cryptographic communication can be issued using an API such as SSL_write( ). At that time, generally, not only the data to be communicated is specified but also an ID for identifying the session is specified. Herein, it is assumed that the abovementioned session identifier is specified at the same time.

The library 300b requests the node 100b for the application key that is required by the application 200b on the transmission side to communicate the specified data. For that reason, to the node 100b, the library 300b issues an application key request in which the session identifier, the size of the required application key, and the usage of the key (such as whether to be used for transmission or for encryption) is specified (Step S404).

The node 100b receives the request from the library 300b; retrieves the application key, which is associated to the session and which is usable in the specified usage, equal to the specified size; and provides the application key to the library 300b (Step S405).

Upon obtaining the application key, the library 300b encrypts the data, which is specified by the application on the transmission side, using the obtained application. Then, the library 300b transmits the encrypted data to the application 200a on the receiving side via the application network (Step S406). Meanwhile, in the case when the application client (the application 200a) is the transmission side, the application server (the application 200b) becomes the receiving side. Once the encrypted data is transmitted, the library 300b can end the operations and return the control to the application server (Step S409, Step S410).

Herein, the explanation is given for an example in which the library 300 not only performs encryption of the data but also transmits the encryption data. However, the sharing of functions between the library 300 and the application 200 is not limited to this case. Alternatively, for example, after obtaining the application key and performing encryption of the data, the library 300 can transmit the encrypted application key to the application 200. Then, transmission of the encryption data can be performed by the application 200. Still alternatively, upon obtaining the application key, the library 300 can transmit that application key to the application 200. Then, encryption of the data and transmission of the encryption data can be performed by the application 200. In this case, the application is configured to include the key managing unit 304.

Moreover, herein, only after the application 200 requests for transmission of data, the library 300 starts obtaining the application key. However, with that, the time delay occurring till the library 300 obtains the application key from the node 100 occurs before the transmission of the encryption data. Hence, it is not a desirable situation. In order to avoid that situation; for example, prior to receiving a data transmission request from the application 200, the library 300 can perform optimization such as obtaining in advance some number of application keys and storing those application keys.

Meanwhile, the application 200a on the receiving side of encryption data instructs cryptographic communication by, for example, calling an API such as SSL_read( ) (Step S407, Step S408). The library 300a receives the encryption data transmitted at Step S406.

The library 300a requests the node 100a for the application key that is required by the application 200a on the receiving side to decrypt the received encryption data. For that reason, to the node 100a, the library 300a issues an application key request in which the session identifier, the size of the required application key, and the usage of the key (such as whether to be used for transmission or for decryption) is specified (Step S411). Meanwhile, in order to identify, from the encryption data received from the application network, the session identifier between the corresponding node 100a; the session identifier of cryptographic data communication and the session identifier between the node 100a are held in a corresponding manner in the library.

The node 100b receives the request from the library 300a; retrieves the application key, which is associated to the session and which is usable in the specified usage, equal to the specified size; and provides the application key to the library 300a (Step S412).

Upon obtaining the application key, the library 300a decrypts the received data and sends the decrypted data to the application 200a (Step S413).

Herein, the explanation is given for an example in which the library 300 not only receives the data but also decrypts the received data. However, the sharing of functions between the library 300 and the application 200 is not limited to this case. Alternatively, for example, after obtaining the application key and performing encryption of the data in response to a request from the application 200, the library 300 can transmit the encrypted data to the application 200. Still alternatively, after obtaining the application key in response to a request from the application 200, the library 300 can transmit the application key to the application 200. Then, data reception and data decryption can be performed by the application 200. In this case, the application is configured to include the key managing unit 304.

Moreover, herein, only after the encryption data is actually received, the library 300 starts obtaining the application key. However, with that, the time delay occurring till the library 300 obtains the application key from the node 100 occurs before the decryption of the encryption data. Hence, it is not a desirable situation. In order to avoid that situation; for example, prior to actually receiving the encryption data (as an example, immediately prior to SSL read library API is called), the library 300 can perform optimization such as obtaining in advance some number of application keys and storing those application keys.

Figure 12:
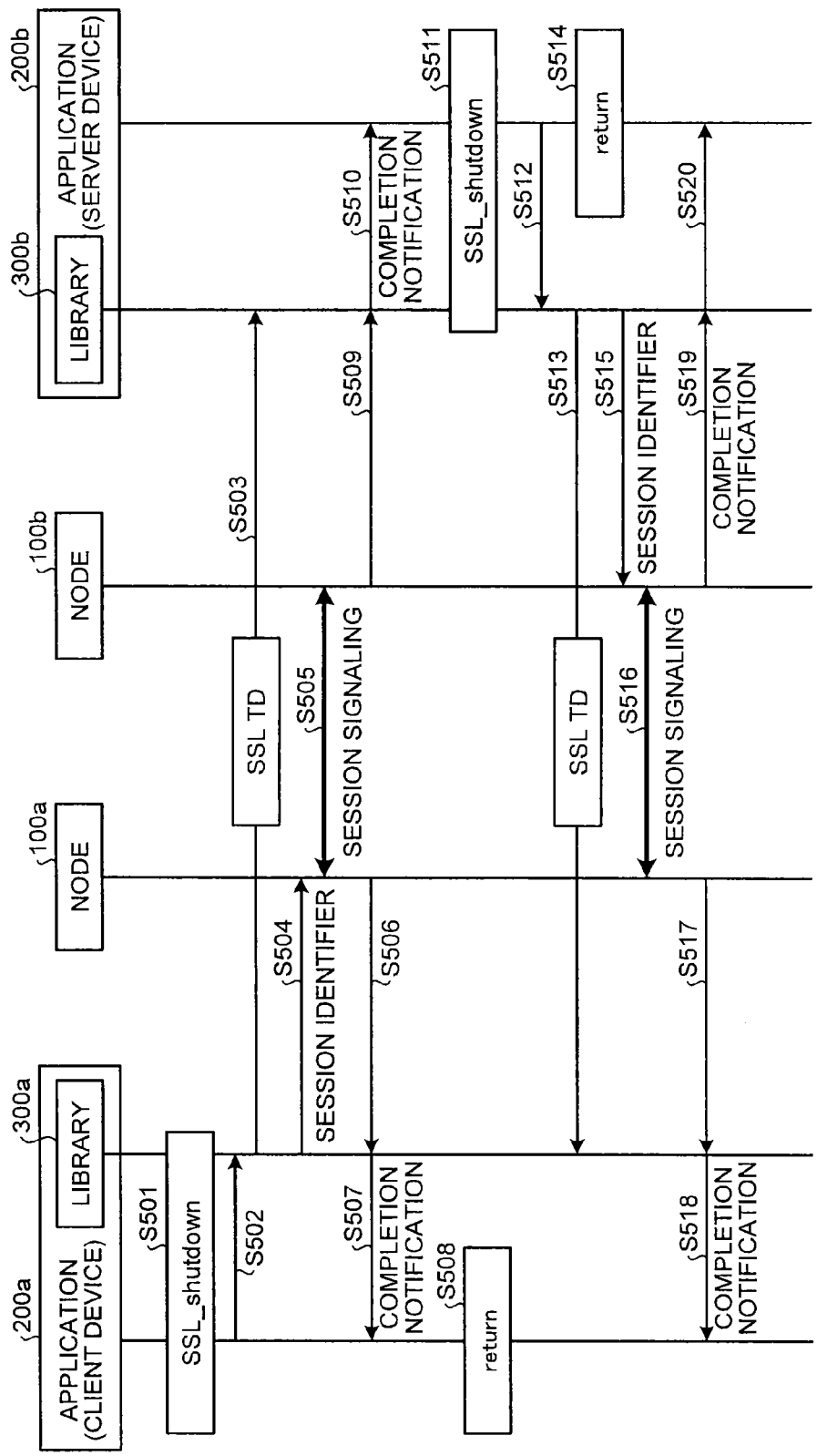
FIG. 12 is a sequence diagram for explaining an encryption data communication ending operation according to the embodiment.

Explained below with reference to FIG. 12 is the operation to end the encryption data communication performed at (4) mentioned above. Be it an application client or an application server, this operation is performed in an identical manner.

The application 200a (can be an application server or an application client) that wishes to end the encryption data communication specifies the session identifier and requests for an end of the encryption data communication. That is started by, for example, the calling of SSL_shutdown( ) API (Step S501, Step S502).

Then, the library 300a receives the request and performs the operation to end the encryption data communication session (Step S503). Herein, the operation to end the encryption data communication session is performed by implementing a commonly-used method, and a teardown operation (SSL TD) is performed between the application 200b (the library 300b of the application 200b) present on the other side.

In addition, the library 300a specifies the session identifier to the node 100a as well as notifies the node 100a about the fact that the encryption data communication through the use of the cryptographic communication network will not be performed anymore (Step S504). Upon receiving that notification, the node 100a may or may not end the sharing operation of sharing the application key that is being performed with the opposite node (the node 100b) specified in the session identifier. However, the node 100a notifies the opposite node 100b about the fact that encryption data communication that was being performed in the session identifier is ended (Step S505).

Once the session is over, the opposite node 100b can notify the library 300b, which is associated to that session, about the end of the session. At that point of time, the node 100b or the library 300b can also send a notification (for example, close notify) about the end of encryption data communication to the application 200b (Step S509, Step S510).

Once the data associated to that session identifier is deleted, the node 100a sends an acknowledgement about the end of session to the library 300a (Step S506). With that, in the application 200a that wishes to end the encryption data communication; the encryption data communication is ended (Step S507, Step S508).

The operations from Step S511 to Step S520 are performed in the case when the application 200b, which serves as an application server, ends the encryption data communication. However, the operations from Step S511 to Step S520 are identical to the operations from Step S501 to Step S510. Hence, the explanation of the operations from Step S511 to Step S520 is not given.

In this way, in the communication device according to the embodiment, during the sequence of calling APIs of the cryptographic library, various communication operations such as address registration, communication instruction, and key acquisition are performed with a cryptographic communication network. For that reason, it becomes possible to easily perform operations such as the address registration operation that is necessary to make use of the cryptic function of the cryptographic communication network. Moreover, even if applications are existing applications that use existing cryptographic library APIs; making use of the libraries according to the embodiment makes it possible to easily perform cryptographic communication through the use of the cryptographic communication network.

Figure 13:
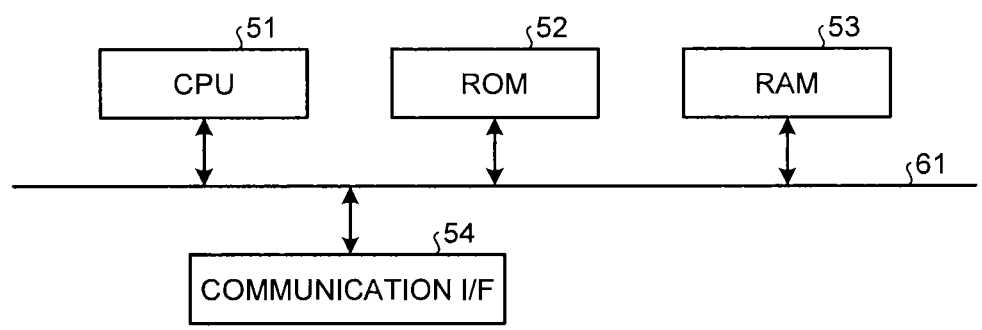
FIG. 13 is a hardware configuration diagram of a communication device according to the embodiment.

Explained below with reference to FIG. 13 is a hardware configuration of the communication device according to the embodiment. FIG. 13 is an explanatory diagram for explaining a hardware configuration of the communication device according to the embodiment.

The communication device according to the embodiment includes a control device such as a central processing unit (CPU) 51; memory devices such as a read only memory (ROM) 52 and a random access memory (RAM) 53; a communication I/F 54 that performs communication by establishing a connection with a network; and a bus 61 that interconnects the other constituent elements.

The computer programs that are executed in the communication device according to the embodiment are stored in advance in the ROM 52.

Alternatively, the computer programs that are executed in the communication device according to the embodiment can be recorded in the form of installable or executable files in a computer-readable recording medium such as a compact disk read only memory (CD-ROM), a flexible disk (FD), a compact disk readable (CD-R), or a digital versatile disk (DVD).

Still alternatively, the computer programs that are executed in the communication device according to the embodiment can be saved as downloadable files on a computer connected to the Internet or can be made available for distribution through a network such as the Internet.

Meanwhile, the computer programs that are executed in the communication device according to the embodiment make a computer function as the constituent elements (the receiving unit, the control unit, the first communicating unit, and the second communicating unit) of the communication device. The computer can read the computer programs from a computer-readable memory medium and run them such that the computer programs are loaded in a main memory device.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A communication device comprising:
   a first communicator configured to acquire a cryptographic key from a second key generating device by performing communication with the second key generating device via a second network, the second key generating device being one of a plurality of key generating devices that generate a cryptographic key;
   a cryptographic communicator configured to perform cryptographic communication with an external device via a first network using the acquired cryptographic key, the external device being connected to a first key generating device of the plurality of key generating devices; and
   a controller configured to perform control to transmit an address registration request containing address information to the second key generating device via the first communicator when a predetermined specific request is issued from among requests used in the cryptographic communication, and to perform control to transmit address information of the external device to the second key generating device via the first communicator when the cryptographic communicator performs the cryptographic communication.

2. The communication device according to claim 1, wherein the specific request is a connection wait request regarding the cryptographic communication.

3. The communication device according to claim 1, wherein the controller is configures to perform control so that the cryptographic communication is performed via the cryptographic communicator when a cryptographic algorithm used by the external device is a cryptographic algorithm in which the cryptographic key is used.

4. The communication device according to claim 3, wherein when a start request regarding the cryptographic communication is issued, the controller is configured to perform control so that negotiation is performed with the external device regarding an encryption parameter to be used in cryptographic communication, and
   when it is determined that the external device implements the cryptographic algorithm in which the cryptographic key is used, the controller is configured to perform control so that the cryptographic communication is performed via the cryptographic communicator.

5. A communication device comprising:
   a first communicator configured to acquire a cryptographic key from a second key generating device by performing communication via a second network with the second key generating device, the second key generating device being one of a plurality of key generating devices that generate a cryptographic key; and
   a controller configured to perform control to transmit an address registration request containing address information to the second key generating device via the first communicator when a predetermined specific request is issued from among requests used in cryptographic communication with an external device via a first network, and to perform control to transmit address information of the external device to the second key generating device via the first communicator when the cryptographic communication is performed, the external device being connected to a first key generating device of the plurality of key generating devices.

6. A computer program product comprising a non-transitory computer-readable medium containing a program executed by a computer, the program causing the computer to execute:
    acquiring, by a first communicator, a cryptographic key from a second key generating device by performing, communication via a second network with the second key generating device, the second key generating device being one of a plurality of key generating devices that generate a cryptographic key; and
    performing control to transmit an address registration request containing address information to the second key generating device via the first communicator when a predetermined specific request is issued from among requests used in cryptographic communication with an external device via a first network, and control to transmit address information of the external device to the second key generating device via the first communicator when the cryptographic communication is performed, the external device being connected to a first key generating device of the plurality of key generating devices.

* * * * *